US010902728B2

(12) United States Patent
Ferrer et al.

(10) Patent No.: US 10,902,728 B2
(45) Date of Patent: Jan. 26, 2021

(54) BLIND SPOT OBJECT DETECTION (71) Applicant: Ford Global Technologies, LLC, Dearborn, MI (US)

(72) Inventors: John Michael Galan Ferrer, Carson City, CA (US); Jayanthi Rao, West Bloomfield, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 15/498,027

(22) Filed: Apr. 26, 2017

(65) Prior Publication Data
US 2018/0315316 A1 Nov. 1, 2018

(51) Int. Cl.
*G08G 1/16* (2006.01)
*B60W 30/18* (2012.01)
*B60W 10/20* (2006.01)
*B60W 10/18* (2012.01)
(Continued)

(52) U.S. Cl.
CPC ............ *G08G 1/167* (2013.01); *B60W 10/18* (2013.01); *B60W 10/20* (2013.01); *B60W 30/18163* (2013.01); *B60W 50/14* (2013.01); B60W 2050/143 (2013.01); B60W 2050/146 (2013.01); B60W 2420/42 (2013.01); B60W 2420/52 (2013.01); B60W 2420/54 (2013.01); B60W 2554/00 (2020.02); B60W 2556/60 (2020.02);
(Continued)

(58) Field of Classification Search
CPC ...... G08G 1/167; B60W 10/18; B60W 10/20; B60W 30/18163; B60W 50/14; B60W 2050/143; B60W 2050/146; B60W 2420/42; B60W 2420/52; B60W 2420/54; B60W 2550/10; B60W 2550/406; B60W 2710/18; B60W 2710/20; B60Q 9/008
USPC .......................................................... 701/41
See application file for complete search history.

(56) References Cited

U.S. PATENT DOCUMENTS 5,517,196 A * 5/1996 Pakett .................. G01S 13/931
342/70
6,038,496 A * 3/2000 Dobler ................. G05D 1/0242
701/3
6,198,409 B1 3/2001 Schofield et al.
(Continued)

FOREIGN PATENT DOCUMENTS

DE 102012107339 A1 * 2/2013 ............. B60R 1/082
EP 2933550 A1 * 10/2015 ............... B60R 1/12
(Continued)

OTHER PUBLICATIONS

Kristof et al., "Efficient Multiclass Object Detection: Detecting Pedestrians and Bicyclists in a Truck's Blind Spot Camera," 2015, Publisher: IEEE.*
(Continued)

*Primary Examiner* — Tuan C To
(74) *Attorney, Agent, or Firm* — Frank A. MacKenzie; Bejin Bieneman PLC (57) ABSTRACT An identified destination roadway lane from a plurality of roadway lanes that is separated from a current roadway lane of a vehicle by at least one roadway lane is received. Upon determining that a blind spot of the vehicle extending across the destination roadway lane and a roadway lane between the destination lane and a current roadway lane is free of objects, a means for providing an alert is actuated.

18 Claims, 6 Drawing Sheets (51) Int. Cl.
   *B60W 50/14* (2020.01)
   *G08G 1/0967* (2006.01)

(52) U.S. Cl.
   CPC ..... *B60W 2710/18* (2013.01); *B60W 2710/20* (2013.01); *G08G 1/096775* (2013.01)

(56) References Cited

U.S. PATENT DOCUMENTS

| | | | |
|---|---|---|---|
| 6,744,353 B2* | 6/2004 | Sjonell | G01S 17/931 340/435 |
| 7,126,456 B2 | 10/2006 | Boddy et al. | |
| 8,244,410 B2* | 8/2012 | Wu | B60Q 9/008 701/1 |
| 8,676,431 B1* | 3/2014 | Mariet | B60T 7/22 701/28 |
| 8,681,016 B2* | 3/2014 | Lee | B60W 30/143 180/169 |
| 8,779,911 B2 | 7/2014 | Belcher et al. | |
| 8,989,916 B2 | 3/2015 | Tippelhofer et al. | |
| 9,211,889 B1* | 12/2015 | Hoetzer | G01S 15/931 |
| 9,266,429 B2 | 2/2016 | Tippelhofer et al. | |
| 9,594,155 B2* | 3/2017 | Cashler | G01S 13/04 |
| 9,834,212 B2* | 12/2017 | Park | H04L 67/12 |
| 9,975,480 B2* | 5/2018 | Lai | G08G 1/167 |
| 10,286,916 B2* | 5/2019 | Prasad | G01S 13/878 |
| 10,488,504 B2* | 11/2019 | Di | G01S 13/04 |
| 2007/0179712 A1* | 8/2007 | Brandt | G01S 13/931 701/300 |
| 2008/0169938 A1* | 7/2008 | Madau | B60R 1/12 340/901 |
| 2008/0186204 A1* | 8/2008 | Buckley | G08G 1/167 340/901 |
| 2009/0045928 A1* | 2/2009 | Rao | B60Q 9/006 340/435 |
| 2009/0063053 A1* | 3/2009 | Basson | B60Q 9/008 702/1 |
| 2009/0237291 A1* | 9/2009 | Sakuma | G01S 5/0072 342/107 |
| 2009/0243822 A1* | 10/2009 | Hinninger | B60Q 9/008 340/435 |
| 2013/0043990 A1 | 2/2013 | Al-Jafar | |
| 2013/0201012 A1* | 8/2013 | Belcher | B60R 1/082 340/425.5 |
| 2014/0035738 A1* | 2/2014 | Kim | G08G 1/167 340/435 |
| 2014/0081566 A1* | 3/2014 | Kuwabara | G08G 1/167 701/300 |
| 2014/0114500 A1 | 4/2014 | Noh | |
| 2016/0203719 A1* | 7/2016 | Divekar | B60R 1/00 701/70 |
| 2016/0355178 A1* | 12/2016 | Shiraishi | B60W 30/06 |
| 2017/0015354 A1* | 1/2017 | Nilsson | G08G 1/167 |
| 2017/0101096 A1 | 4/2017 | Kim | |
| 2017/0174262 A1* | 6/2017 | Kobayashi | B60Q 3/00 |
| 2017/0305418 A1* | 10/2017 | Bae | B60W 50/0098 |
| 2018/0061238 A1* | 3/2018 | Lei | G08G 1/162 |

FOREIGN PATENT DOCUMENTS

| | | |
|---|---|---|
| GB | 2543647 A | 4/2017 |
| JP | 2012221353 A | 11/2012 |
| JP | 2015230678 A | 12/2015 |
| KR | 20160061639 A | 6/2016 |
| WO | WO-2016027351 A1 * | 2/2016 ............ B60W 40/04 |

OTHER PUBLICATIONS

V. Balisavira et al., "Real-Time Object Detection by Road Plane Segmentation Technique for ADAS," 2012, Publisher: IEEE.*
Search Report from United Kingdom Intellectual Property Office dated Oct. 23, 2018 regarding Application No. GB1806634.0 ( 5 pages).

* cited by examiner

FIG. 7

BLIND SPOT OBJECT DETECTION

BACKGROUND

Vehicles often travel through a plurality of roadway lanes. When moving from a current roadway lane to an adjacent roadway lane, a side mirror installed on a vehicle door can allow a user to see objects in the adjacent roadway lane. When moving amongst a plurality of roadway lanes, the user can use the side mirror to see objects in one or more other roadway lanes, e.g., in a roadway lane immediately adjacent to the current roadway lane.

DETAILED DESCRIPTION

A system includes a computer programmed to identify a destination roadway lane that is separated from a current roadway lane of a vehicle by at least one intervening roadway lane, and, upon determining that a blind spot of the vehicle extending across the destination roadway lane and a roadway lane between the destination lane and a current roadway lane is free of objects, provide an alert, e.g., actuate a vehicle light, e.g., in a side-view mirror, a display, etc., to provide a notification that the destination lane and an intervening lane are free of objects that could pose a lane-change hazard.

The computer can be further programmed to actuate a vehicle component to move the vehicle to the destination roadway lane.

The computer can be further programmed to actuate a means for providing a second alert upon determining to accelerate the vehicle until the blind spot is free of objects.

The computer can be further programmed to actuate a means for providing a second alert upon determining to decelerate the vehicle until the blind spot is free of objects.

The computer can be further programmed to actuate a means for providing a second alert upon determining to maintain a vehicle trajectory until the blind spot is free of objects.

The computer can be further programmed to identify a destination along a route and wherein the destination lane is based on the destination.

The computer can be further programmed to actuate a means for stopping the alert when an object enters the blind spot.

The computer can be further programmed to, upon moving the vehicle to the roadway lane adjacent to the destination roadway lane, actuate a means for stopping the alert when an object enters a portion of the blind spot extending through the destination roadway lane.

The can be computer is further programmed to actuate a means for providing a plurality of alerts, each alert indicating whether a portion of the blind spot extending into one of the destination roadway lane and the roadway lanes between the current roadway lane and the destination roadway lane is free of objects.

The side mirror can include a blind spot mirror and the means for providing the alert can include a light disposed around the blind spot mirror.

A method can include a destination roadway lane that is separated from a current roadway lane of a vehicle by at least one intervening roadway lane, and, upon determining that a blind spot of the vehicle extending across the destination roadway lane and a roadway lane between the destination lane and a current roadway lane is free of objects, actuating a means for providing an alert.

The method can further include actuating a vehicle component to move the vehicle to the destination roadway lane.

The method can further include actuating a means for providing a second alert upon determining to accelerate the vehicle until the blind spot is free of objects.

The method can further include actuating a means for providing a second alert upon determining to decelerate the vehicle until the blind spot is free of objects.

The method can further include actuating a means for providing a second alert upon determining to maintain a vehicle trajectory until the blind spot is free of objects.

The method can further include identifying a destination along a route and wherein the destination lane is based on the destination.

The method can further include actuating a means for stopping the alert when an object enters the blind spot.

The method can further include, upon moving the vehicle to the roadway lane adjacent to the destination roadway lane, actuating a means for stopping the alert when an object enters a portion of the blind spot extending through the destination roadway lane.

The method can further include actuating a means for providing a plurality of alerts, each alert indicating whether a portion of the blind spot extending into one of the destination roadway lane and the roadway lanes between the current roadway lane and the destination roadway lane is free of objects.

In the method, the side mirror can include a blind spot mirror and the means for actuating the alert can include a light disposed around the blind spot mirror.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

As used herein, a "blind spot" is a portion of a roadway lane that cannot typically be viewed by a vehicle operator via a side mirror. Based on a position of the side mirror, a portion of the roadway lane adjacent (i.e., immediately next to) to the current roadway lane of a vehicle may not be visible in the side mirror when viewed from an operator's e.g., a driver's, seat. The portion of the roadway not visible is the "blind spot" of the side mirror. Furthermore, portions of roadway lanes beyond the adjacent roadway lane may not be visible in the side mirror. That is, the blind spot can include portions of more than one roadway lane.

Figure 1:
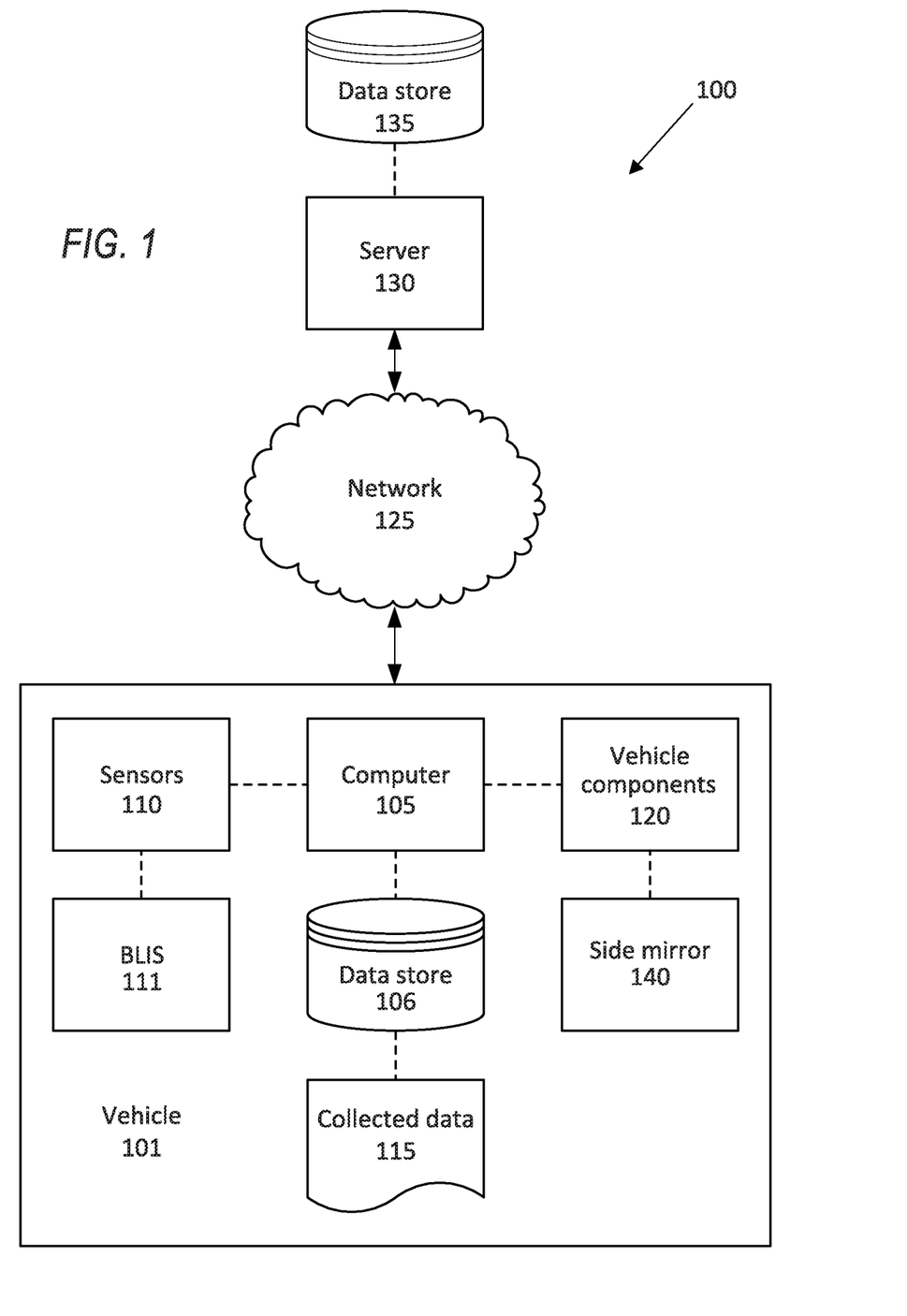
FIG. 1 is a block diagram of an example system for identifying an object in a roadway lane.

FIG. 1 illustrates a system 100 for identifying an object in a blind spot near a vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

A blind spot indicator subsystem (BLIS) 111 can be programmed to detect objects in the vehicle 101 blind spot. The BLIS 111 can include one or more sensors 110, e.g., ultrasonic sensors 110. The BLIS 111 can detect objects in portions of roadway lanes typically not visible by a driver in a side mirror. The BLIS 111 can actuate an indicator (e.g., a light, a prerecorded sound, etc.) upon detecting objects in the blind spot.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
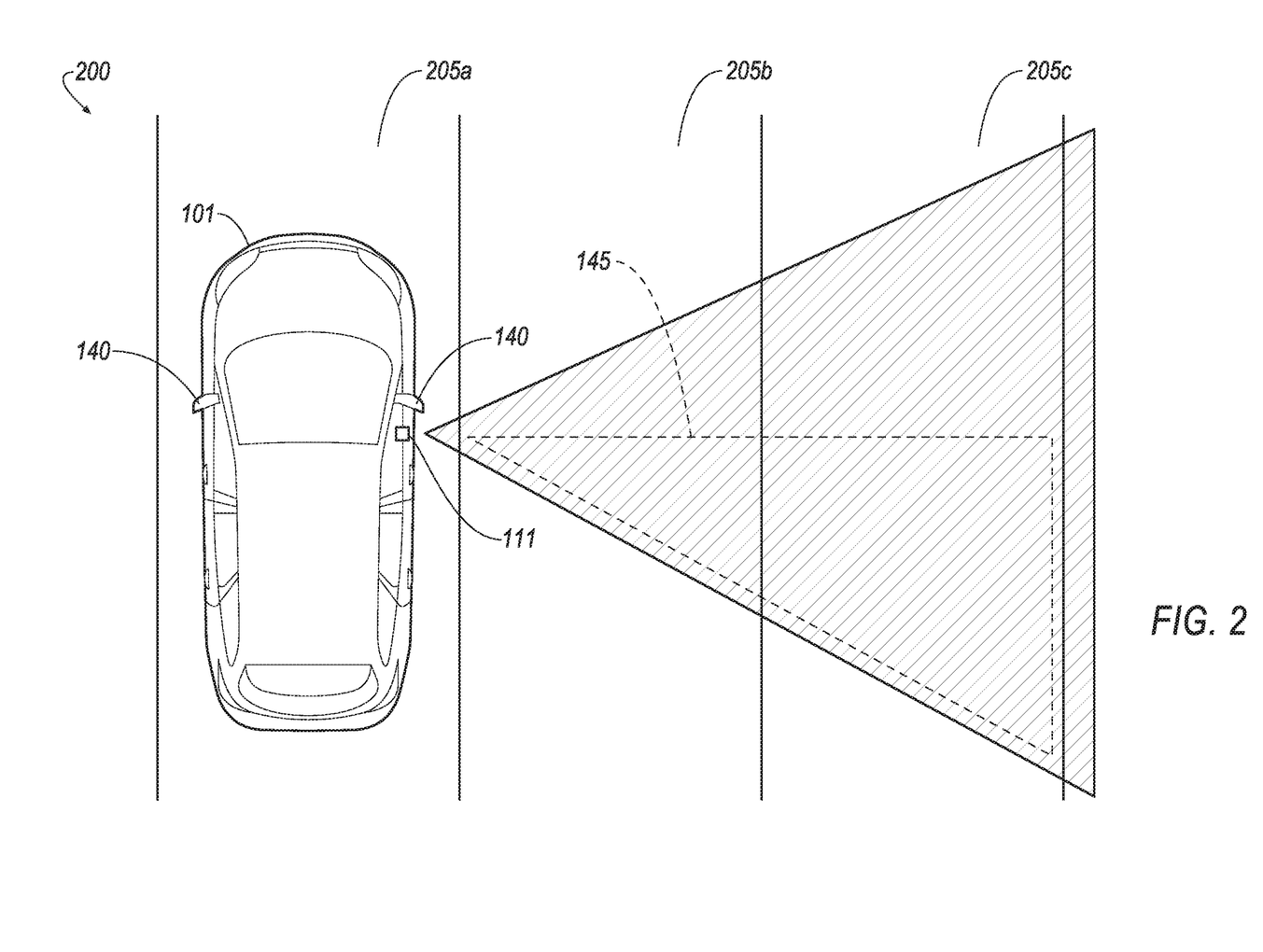
FIG. 2 is a view of an example vehicle actuating a blind spot sensor to detect the object across a plurality of roadway lanes.
Figure 6:
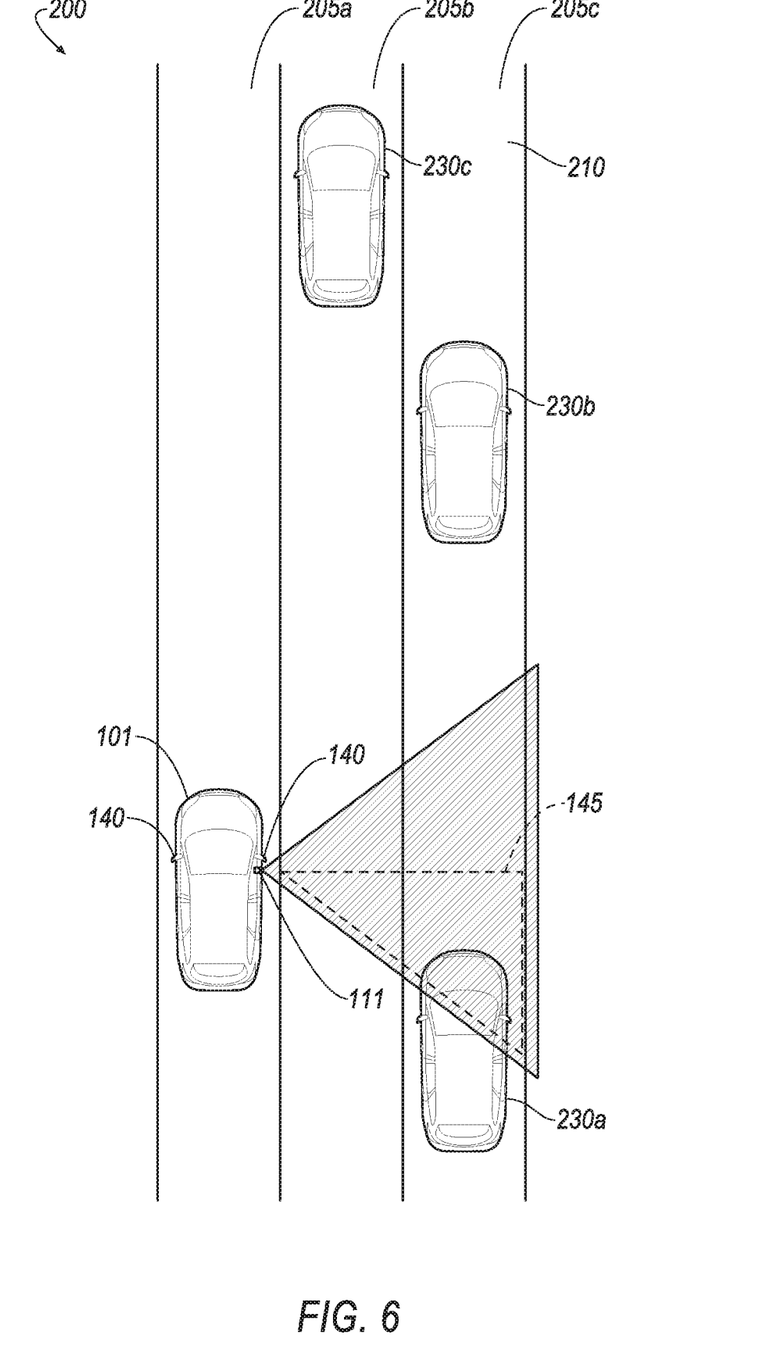
FIG. 6 is a view of the example vehicle of FIG. 2 identifying the object in the roadway lane.

The vehicle 101 includes a side mirror 140. The side mirror 140 allows the vehicle 101 operator to view the roadway next to the side of the vehicle 101. That is, the side mirror 140 shows the roadway next to the side of the vehicle 101 so that the operator can view objects that are moving alongside the vehicle 101 without turning the operator's ahead away from viewing the roadway ahead the vehicle 101. However, the side mirror 140 may show only a portion of the roadway next to the side of the vehicle 101, and a portion of the roadway may not be visible in the side mirror 140, i.e., a blind spot 145 as shown in FIGS. 2 and 6. The vehicle 101 can include two side mirrors 140.

FIG. 2 illustrates the BLIS 111 in the vehicle 101. The vehicle 101 can move in a roadway 200 having a plurality of roadway lanes 205. In the example of FIG. 2, the vehicle 101 is moving in the roadway lane 205a, a roadway lane 205b is adjacent to the roadway lane 205a, and a roadway lane 205c is adjacent to the roadway lane 205b. The BLIS 111 can use ultrasonic sensors 110 to detect objects in the roadway lanes 205b, 205c. That is, the ultrasonic sensors 110 can transmit ultrasonic waves from a transducer fixed in the side of the vehicle 101. When the ultrasonic waves reflect off of an object and return to the ultrasonic sensors 110, the ultrasonic sensors 110 can determine, using known techniques, whether the ultrasonic waves reflected off of an object in one of the roadway lanes 205b, 205c.

The computer 105 can identify a destination roadway lane 210. The computer 105 can identify the destination roadway lane 210 based on, e.g., input from a user, a route determined by a navigation component, etc. The computer 105 can receive the identified destination roadway lane 210 from the server 130. The vehicle 101 can move along a predetermined route to a destination, and while traveling along the route, the vehicle 101 may cross a plurality of roadway lanes 205, ending in the destination roadway lane 210. For example, the vehicle 101 may move from the roadway lane 205a to the roadway lane 205c, crossing the roadway lane 205b. In this example, the roadway lane 205c is the destination roadway lane 210. The computer 105 can use the BLIS 111 to determine whether the blind spot 145 in the roadway lanes 205 between the current roadway lane 205 and the destination lane 210 is free of objects, i.e., whether the vehicle 101 can move to the destination roadway lane 210 without colliding into another object, typically another vehicle.

Upon determining that the destination lane 210 is free of objects, the computer 105 can be programmed to provide an alert to the user. The computer 105 can actuate an alert device to indicate to the user that the destination lane 210 is free of objects and to move the vehicle 101 to the destination lane 210. The alert device can include, e.g., a light disposed on the side mirror 140, a light and/or other visual indicator on a vehicle 101 dashboard and/or heads-up display, an audio indicator from a vehicle 101 speaker, a haptic device installed in a vehicle 101 seat and/or steering wheel, etc. The computer 105 can provide a plurality of alerts by actuating a plurality of alert devices based on the presence of objects in the destination lane 210 and roadway lanes 205 between the current roadway lane 205 and the destination lane 210.

Figure 3:
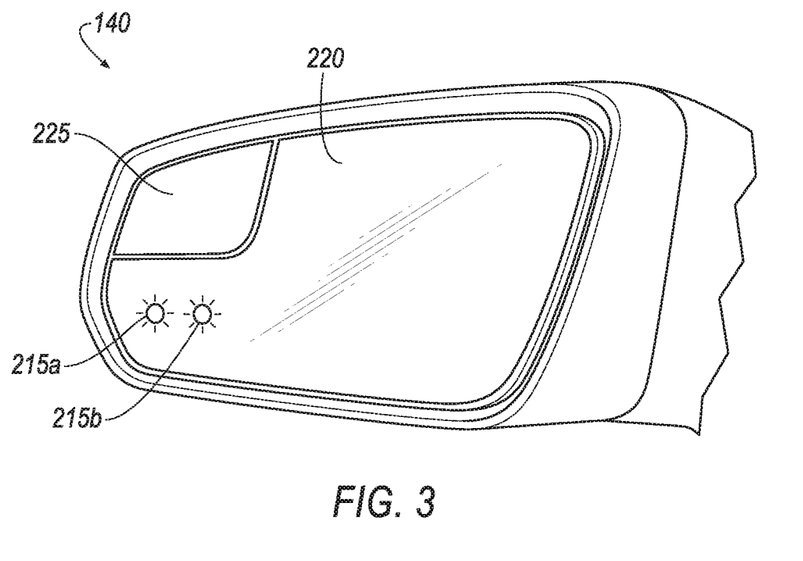
FIG. 3 is a view of an example side mirror including indicator lights.

FIG. 3 illustrates an example side mirror 140. The side mirror 140 can include a plurality of alert devices, e.g., a first indicator light 215a and a second indicator light 215b. The computer 105 can actuate the first indicator light 215a when the BLIS 111 identifies an object in the adjacent roadway lane 205. The computer 105 can actuate the second indicator light 215b upon determining that the destination lane 210 is free of objects. That is, the BLIS 111 can determine the presence of objects in the destination lane 210 and the intervening roadway lanes 205 between the destination lane 210 and the current roadway lane 205 of the vehicle 101. If an object is present in the adjacent roadway lane 205, the computer 105 can determine to actuate the first indicator light 215a, instructing the operator not to move the vehicle 101 until the object leaves the adjacent roadway lane 205.

The side mirror 140 can include a main mirror 220 a blind spot mirror 225. The blind spot mirror 225 is angled relative to the main mirror 220. The user can position the side mirror such that the main mirror 220 reflects a portion of the roadway lane 205 and the blind spot mirror 225 reflects the blind spot 145 in the adjacent roadway lane 205. Thus, the larger main mirror 220 can reflect a larger portion of the roadway lane 205 behind the blind spot 145 and the smaller blind spot mirror 225 can reflect the blind spot 145.

Figure 4:
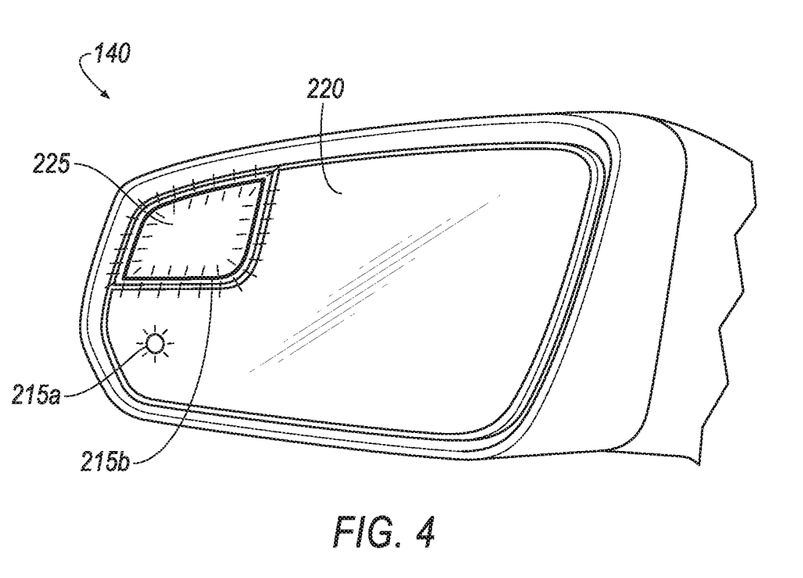
FIG. 4 is a view of another example side mirror including indicator lights.

FIG. 4 illustrates another example side mirror 140. The side mirror 140 can include the first indicator light 215a on the main mirror 220 and the second indicator light 215b surrounding the blind spot mirror 225. Because the second indicator light 215b is disposed around the blind spot mirror 225 and not on the main mirror 220, the user can quickly identify whether it is safe to move the vehicle into the destination roadway lane 210.

As shown in FIGS. 3-4, the indicator lights 215a, 215b can be individually actuated based on the presence of objects in the roadway lanes 205. The computer 105 can selectively actuate the first light 215a and the second light 215b based on data 115 from the BLIS 111 of objects in the destination roadway lane 210 and the intervening roadway lanes 205 between the current roadway lane 205 and the destination lane 210.

The computer 105 can actuate the first indicator light 215a upon detecting objects in the adjacent roadway lane 205. The computer 105 can actuate the second indicator light light 215b when the BLIS 111 detects no objects in the portion of the blind spot 145 in the destination roadway lane 210. Thus, when the operator sees the first light 215a actuated but not the second light 215b, the operator can determine to wait until the adjacent roadway lane 205 is free of objects before moving into the adjacent roadway lane 205 toward the destination lane 210. Furthermore, when the operator sees the second indicator light 215b but not the first indicator light 215a, the operator can determine to move to the adjacent roadway lane 205 but not to move to the destination lane 210 until the blind spot 145 in the destination lane 210 is free of objects. In the example of FIG. 3, the first light 215a and the second light 215b are both illustrated as small circular lights, e.g., LEDs, disposed on the side mirror and substantially similar in size and shape. Alternatively or additionally and as shown in the example of FIG. 4, the second light 215b can be disposed around the blind spot mirror 225 and substantially differ in shape and/or size from the first light 215a.

Figure 5:
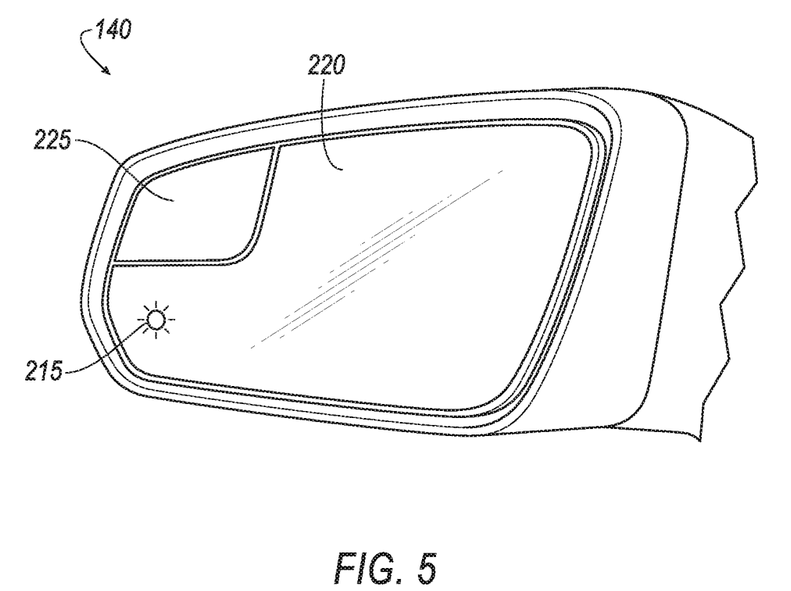
FIG. 5 is a view of another example side mirror including a single indicator light.

FIG. 5 illustrates an example side mirror 140 having a single alert device that is an indicator light 215. The indicator light 215 can be a single light having two colors, e.g., green and red. The computer 105 can actuate the indicator light 215 with the first color (e.g., red) upon detecting objects in the adjacent roadway lane 205, and the computer 105 can actuate the indicator light 215 with the second color (e.g., green) when no objects are in the blind spot 145 in the destination lane 210. Thus, based on the color of the indicator light 215, the user can determine whether to move the vehicle 101 into the adjacent roadway lane 205 toward the destination lane 210.

FIG. 6 illustrates objects 230 in the roadway lanes 205 detected by the BLIS 111. The computer 105 can actuate the BLIS 111 to detect an object 230 in an adjacent roadway lane 205, e.g., a target vehicle 230a in the roadway lane 205c. The example of FIG. 5 includes objects 230a, 230b that are not in the blind spot 145 of the vehicle 101. The computer 105 can detect an object 230 in the blind spot 145 in the destination lane 210 (in FIG. 5, the target vehicle 230a in the roadway lane 205c) and no object 230 in the roadway lane 205b. Because there is an object 230 in the blind spot 145 but not in the adjacent roadway lane 205, the computer 105 can actuate neither the first indicator light 215a (because there is no object 230 in the adjacent roadway lane 205) nor the second indicator light 215b (because there is an object 230 in the destination lane 210). Thus, the operator can move the vehicle 101 into the roadway lane 205b but not into the destination lane 210. When the object 230a moves out of the blind spot 145 in the destination lane 210, the computer 105 can actuate the second light 215b to indicate to the operator to move the vehicle 101 to the destination lane 210.

The computer 105 can be programmed to provide a second alert, e.g., actuating the first indicator light 215a, upon determining to adjust the vehicle 101 trajectory to move the blind spot 145 such that the objects 230 are no longer in the blind spot 145. When the vehicle 101 is operating in an autonomous mode or a semi-autonomous mode, the computer 105 can adjust the propulsion 120 of the vehicle 101 based on the objects 230 in the blind spot 145. The computer 105 can actuate the first indicator light 215a to indicate to the vehicle 101 operator that an object 230 is present in the blind spot 145 in the adjacent roadway lane 205. For example, the computer 105 can be programmed to accelerate the vehicle 101 until the blind spot 145 is free of objects 230 and to provide the second alert upon determining to accelerate. In another example, the computer 105 can be programmed to decelerate the vehicle 101 until the blind spot 145 is free of objects 230 and to provide the second alert upon determining to decelerate. In another example, the computer 105 can be programmed to maintain the current vehicle 101 trajectory as the object 230 moves through the blind spot 145 and to actuate the first indicator light 215*a* upon determining to maintain the vehicle 101 trajectory.

The computer 105 can be programmed to stop the alert upon detecting the object 230 entering the blind spot 145 in the destination lane 210. As the vehicle 101 moves across the roadway lanes 205 to the destination lane 210, an object 230 can enter the blind spot 145. The BLIS 111 can detect the object 230, and the computer 105 can deactivate the second indicator light 215*b*. Alternatively or additionally, the computer 105 can be programmed to actuate the first indicator light 215*a* upon detecting the object 230 in the blind spot 145 in the adjacent roadway lane 205.

Figure 7:
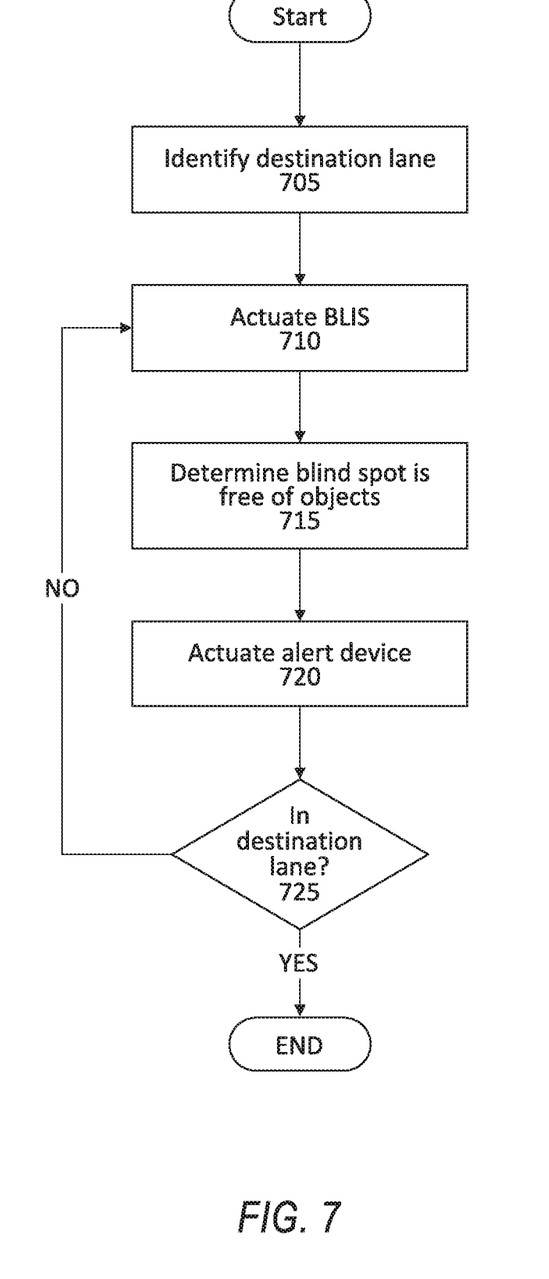
FIG. 7 is a block diagram of an example process for identifying the object in the roadway lane.

FIG. 7 illustrates an example process 700 for identifying objects in a roadway lane 205 with a BLIS 111. The process 700 starts in a block 705, in which the computer 105 determines a destination roadway lane 210. Advantageously, this determination is made in the absence of operator input (e.g., activation of a turn signal). The computer 105 can use a route determined by a navigation subsystem to predict that an operator will cause the vehicle 101 to move to a specific roadway lane 205. For an upcoming portion of the route, the computer 105 can identify a destination roadway lane 210 such as an exit ramp or a lane leading to an exit ramp that would move the vehicle 101 along the route, e.g., to another roadway 200.

Next, in a block 710, the computer 105 actuates the BLIS 111 to detect objects 230 in the roadway lanes 205. The computer 105 can actuate sensors 110 in the BLIS 111 (e.g., ultrasonic transducers) to collect data 115 in the roadway lanes 205. As shown in FIGS. 2 and 5, the BLIS 111 can collect data 115 from a plurality of roadway lanes 205, including one or more roadway lanes 205 that are not adjacent to the current roadway lane 205 of the vehicle 101.

Next, in a block 715, the computer 105 determines whether the blind spot 145 in the adjacent roadway lane 205 and the destination lane 210 is free of objects 230. That is, based on the data 115 from the BLIS 111, the computer 105 can identify the presence of objects 230 in the roadway lanes 205 between and including the current roadway lane 205 of the vehicle 101 and the destination roadway lane 210.

Next, in a block 720, the computer 105 actuates one or more alert devices based on one or more objects 230 detected, if any, in the roadway lanes 205. For example, if one or more objects 230 is detected in the adjacent roadway lane 205, the computer 105 can actuate a first indicator light 215*a*, indicating to the operator to look for objects 230 when changing roadway lanes 205. If no objects 230 are detected in the destination lane 210, the computer 105 can actuate a second indicator light 215*b*.

Next, in a block 725, the computer 105 determines whether the vehicle 101 is in the destination lane 210. The vehicle 101 can use location data 115 from the server 130 to determine the current roadway lane 205 and whether the current roadway lane 205 is the destination lane 210. If the vehicle 101 is in the destination lane 210, the process 700 ends. Otherwise, the process 700 returns to the block 710 to detect objects 230 in the next roadway lane 205.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify a destination roadway lane that is separated from a current roadway lane of a vehicle by at least one intervening roadway lane;
   identify a blind spot of an operator of the vehicle extending across a roadway lane between the destination roadway lane and the current roadway lane and into the destination roadway lane;
   upon determining that the blind spot is free of objects, actuate a means for providing an alert; and
   actuate a means for providing a second alert upon determining to accelerate the vehicle until the blind spot is free of objects.

2. The system of claim 1, wherein the instructions further include instructions to actuate a vehicle component to move the vehicle to the destination roadway lane.

3. The system of claim 1, wherein the instructions further include instructions to actuate a means for providing a second alert upon determining to decelerate the vehicle until the blind spot is free of objects.

4. The system of claim 1, wherein the instructions further include instructions to actuate a means for providing a second alert upon determining to maintain a vehicle trajectory until the blind spot is free of objects.

5. The system of claim 1, wherein the instructions further include instructions to identify a destination along a route and wherein the destination roadway lane is based on the destination.

6. The system of claim 1, wherein the instructions further include instructions to actuate a means for stopping the alert when an object enters the blind spot.

7. The system of claim 1, wherein the instructions further include instructions to, upon moving the vehicle to the roadway lane adjacent to the destination roadway lane, actuate a means for stopping the alert upon detecting an object entering a portion of the blind spot extending through the destination roadway lane.

8. The system of claim 1, wherein the instructions further include instructions to actuate a means for providing a plurality of alerts, each alert indicating whether a portion of the blind spot extending into one of the destination roadway lane and the roadway lanes between the current roadway lane and the destination roadway lane is free of objects.

9. The system of claim 1, further comprising a side mirror including a blind spot mirror and the means for providing the alert includes a light disposed around the blind spot mirror.

10. A method, comprising:
    identifying a destination roadway lane that is separated from a current roadway lane of a vehicle by at least one intervening roadway lane;
    identifying a blind spot of an operator of the vehicle extending across a roadway lane between the destination roadway lane and the current roadway lane and into the destination roadway lane;
    upon determining that the blind spot is free of objects, actuating a means for providing an alert; and
    actuate a means for providing a second alert upon determining to accelerate the vehicle until the blind spot is free of objects.

11. The method of claim 10, further comprising actuating a vehicle component to move the vehicle to the destination roadway lane.

12. The method of claim 10, further comprising actuating a means for providing a second alert upon determining to decelerate the vehicle until the blind spot is free of objects.

13. The method of claim 10, further comprising actuating a means for providing a second alert upon determining to maintain a vehicle trajectory until the blind spot is free of objects.

14. The method of claim 10, further comprising identifying a destination along a route and wherein the destination roadway lane is based on the destination.

15. The method of claim 10, further comprising actuating a means for stopping the alert when an object enters the blind spot.

16. The method of claim 10, further comprising, upon moving the vehicle to the roadway lane adjacent to the destination roadway lane, actuating a means for stopping the alert upon detecting an object entering a portion of the blind spot extending through the destination roadway lane.

17. The method of claim 10, further comprising actuating a means for providing a plurality of alerts, each alert indicating whether a portion of the blind spot extending into one of the destination roadway lane and the roadway lanes between the current roadway lane and the destination roadway lane is free of objects.

18. The method of claim 10, wherein the vehicle includes a side mirror including a blind spot mirror and the means for providing the alert includes a light disposed around the blind spot mirror.

* * * * *